(12) United States Patent
Kim et al.

(10) Patent No.: US 9,304,364 B2
(45) Date of Patent: Apr. 5, 2016

(54) LIQUID CRYSTAL DISPLAY HAVING MULTIPLE PATTERNED SUBPIXEL ELECTRODES

(71) Applicant: SAMSUNG DISPLAY CO., LTD., Yongin, Gyeonggi-do (KR)

(72) Inventors: Dong-Gyu Kim, Yongin-si (KR); Sahng-Ik Jun, Yongin-si (KR); Seung-Soo Baek, Seoul (KR); Kee-Bum Park, Chunan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 131 days.

(21) Appl. No.: 14/150,687

(22) Filed: Jan. 8, 2014

(65) Prior Publication Data

US 2014/0125899 A1 May 8, 2014

Related U.S. Application Data

(62) Division of application No. 12/363,406, filed on Jan. 30, 2009, now Pat. No. 8,643,816.

(30) Foreign Application Priority Data

Jan. 30, 2008 (KR) .................. 10-2008-0009738

(51) Int. Cl.
*G02F 1/1343* (2006.01)
*G02F 1/1362* (2006.01)

(52) U.S. Cl.
CPC .... *G02F 1/134363* (2013.01); *G02F 1/134336* (2013.01); *G02F 1/13624* (2013.01); *G02F 2001/134345* (2013.01)

(58) Field of Classification Search
CPC ............... G02F 2001/134345; G02F 1/13624;
G02F 1/133707; G02F 1/136213; G02F 1/1393; G02F 1/134336; G02F 1/134309; G02F 2201/40; G02F 1/133753; G09G 3/3648; G09G 2300/0447
See application file for complete search history.

(56) References Cited

U.S. PATENT DOCUMENTS 9,052,549 B2 *  6/2015  Lee et al.
2007/0013854 A1  1/2007  Yoo et al.

(Continued)

FOREIGN PATENT DOCUMENTS

| JP | 2006-0201353 | 8/2006 |
| JP | 2006-276432 | 10/2006 |
| KR | 2006-0116580 | 11/2006 |

*Primary Examiner* — Huyen Ngo
(74) *Attorney, Agent, or Firm* — Innovation Counsel LLP

(57) ABSTRACT

Provided is a liquid crystal display (LCD), the LCD includes: an insulating substrate; a first gate line and a second gate line which are formed on the insulating substrate and extend parallel to each other; a data line formed on the insulating substrate, insulated from the first and second gate lines, and crossing the first and second gate lines; a first subpixel electrode connected to the first gate line and the data line by a first switching device and includes a plurality of first fine protruding patterns at an edge thereof; and a second subpixel electrode connected to the second gate line and the data line by a second switching device and including a plurality of second fine protruding patterns at an edge thereof, wherein the first fine protruding patterns are separated from each other by a first gap, and the second fine protruding patterns are separated from each other by a second gap, wherein the sum of a width of the first gap and a width of each of the first fine protruding patterns is greater than the sum of a width of the second gap and a width of each of the second protruding patterns.

14 Claims, 11 Drawing Sheets

(56) References Cited

U.S. PATENT DOCUMENTS

| | | | |
|---|---|---|---|
| 2008/0278651 A1* | 11/2008 | Lee et al. ........................ | 349/43 |
| 2010/0097535 A1* | 4/2010 | Inoue et al. .................... | 349/38 |
| 2010/0103339 A1* | 4/2010 | Shimoshikiryoh et al. ..... | 349/39 |
| 2010/0123844 A1 | 5/2010 | Um et al. | |
| 2010/0201927 A1 | 8/2010 | Kuo et al. | |

* cited by examiner

LIQUID CRYSTAL DISPLAY HAVING MULTIPLE PATTERNED SUBPIXEL ELECTRODES This application is a Divisional application of U.S. patent application Ser. No. 12/363,406 filed on Jan. 30, 2009, which claims priority and benefit under 35 U.S.C. §119 to Korean Patent Application No. 10-2008-0009738, filed on Jan. 30, 2008 in the Korean Intellectual Property Office, the disclosure of which is incorporated herein by reference in its entirety.

BACKGROUND

1. Technical Field

Embodiment of the present invention relate to a liquid crystal display (LCD), and more particularly, to an LCD with reduced response time of liquid crystals, increased effective aperture ratio of each pixel, and thus improved light transmission of each pixel.

2. Description of the Related Art

Liquid crystal displays (LCDs) are one of the most widely used flat panel displays (FPDs). An LCD includes two substrates, on which electrodes are formed, and a liquid crystal layer interposed between the two substrates. The LCD rearranges liquid molecules of the liquid crystal layer by applying voltage to the electrodes and thus controls the amount of light transmitted. In this way, the LCD displays a desired image.

LCDs can be made thin, consume relatively low power, and hardly generate electromagnetic waves harmful to the human body. However, since their lateral visibility is poor compared to front visibility, various methods of arranging liquid crystals and various driving methods are being developed to overcome this drawback. For a wide viewing angle, patterned vertical alignment (PVA) mode LCDs, which are vertical alignment (VA) mode LCDs having slits for domain partition, and in-plane switching (IPS) mode LCDs, which employ a transversal field method, are being suggested.

If each pixel electrode is partitioned into a plurality of domains as described above in order to achieve a wide viewing angle, an aperture ratio is reduced as the number of domains included in each pixel increases, which results in a reduction in luminance. On the other hand, as the number of domains included in each pixel is reduced, the aperture ratio increases. In this case, however, it is difficult to effectively control liquid crystals since the gap between electrodes increases. Thus, the directionality of the liquid crystals is unstable. Such unstable directionality of liquid crystals creates texture, reduces luminance, and increases response time.

In this regard, an optimized LCD structure, which can increase the aperture ratio and reduce the response time, is required.

SUMMARY

Aspects of the present invention in accordance with various embodiments provide a liquid crystal display (LCD) with reduced response time of liquid crystals, increased effective aperture ratio of each pixel, and thus improved light transmission of each pixel.

However, aspects of the present invention in accordance with the various embodiments are not restricted to the one set forth herein. The above and other aspects of the present invention will become more apparent to one of ordinary skill in the art to which the present invention pertains by referencing the detailed description.

In one aspect of the present invention in accordance with an embodiment, there is provided an LCD including: an insulating substrate; a first gate line and a second gate line which are formed on the insulating substrate and extend parallel to each other; a data line which is formed on the insulating substrate, insulated from the first and second gate lines, and crosses the first and second gate lines; a first subpixel electrode which is connected to the first gate line and the data line by a first switching device and includes a plurality of first fine protruding patterns at an edge thereof; and a second subpixel electrode which is connected to the second gate line and the data line by a second switching device and includes a plurality of second fine protruding patterns at an edge thereof, wherein the first fine protruding patterns are separated from each other by a first gap, and the second fine protruding patterns are separated from each other by a second gap, wherein the sum of a width of the first gap and a width of each of the first fine protruding patterns is greater than the sum of a width of the second gap and a width of each of the second protruding patterns.

According to another aspect of the present invention in accordance with an embodiment, there is provided an LCD including: a first display plate which comprises a first subpixel electrode and a second subpixel electrode; a second display plate which faces the first display plate and includes a common electrode; and a liquid crystal layer which is interposed between the first and second display plates, wherein the first subpixel electrode is formed on a first insulating substrate and driven by a first switching device, the second subpixel electrode is formed on the first insulating substrate, driven by a second switching device, and includes a plurality of fine protruding patterns at an edge thereof, and the common electrode has slit patterns which face the first and second subpixel electrodes, wherein the slit patterns facing the first subpixel electrode include concavo-convex patterns.

According to another aspect of the present invention in accordance with an embodiment, there is provided an LCD including: an insulating substrate; a first subpixel electrode which is formed on the insulating substrate, driven by a first switching device, and includes a flat portion and a plurality of first fine protruding patterns formed at an edge of the flat portion; and a second subpixel electrode which is formed on the insulating substrate, driven by a second switching device, and includes a second flat portion and a plurality of second fine protruding patterns formed at an edge of the second flat portion, wherein a width of the second flat portion is greater than a width of the first flat portion.

BRIEF DESCRIPTION OF THE DRAWINGS

The above and other aspects and features of the present invention in accordance with various embodiments will become more apparent by describing in detail exemplary embodiments thereof with reference to the attached drawings, in which.

DETAILED DESCRIPTION

Figure 1:
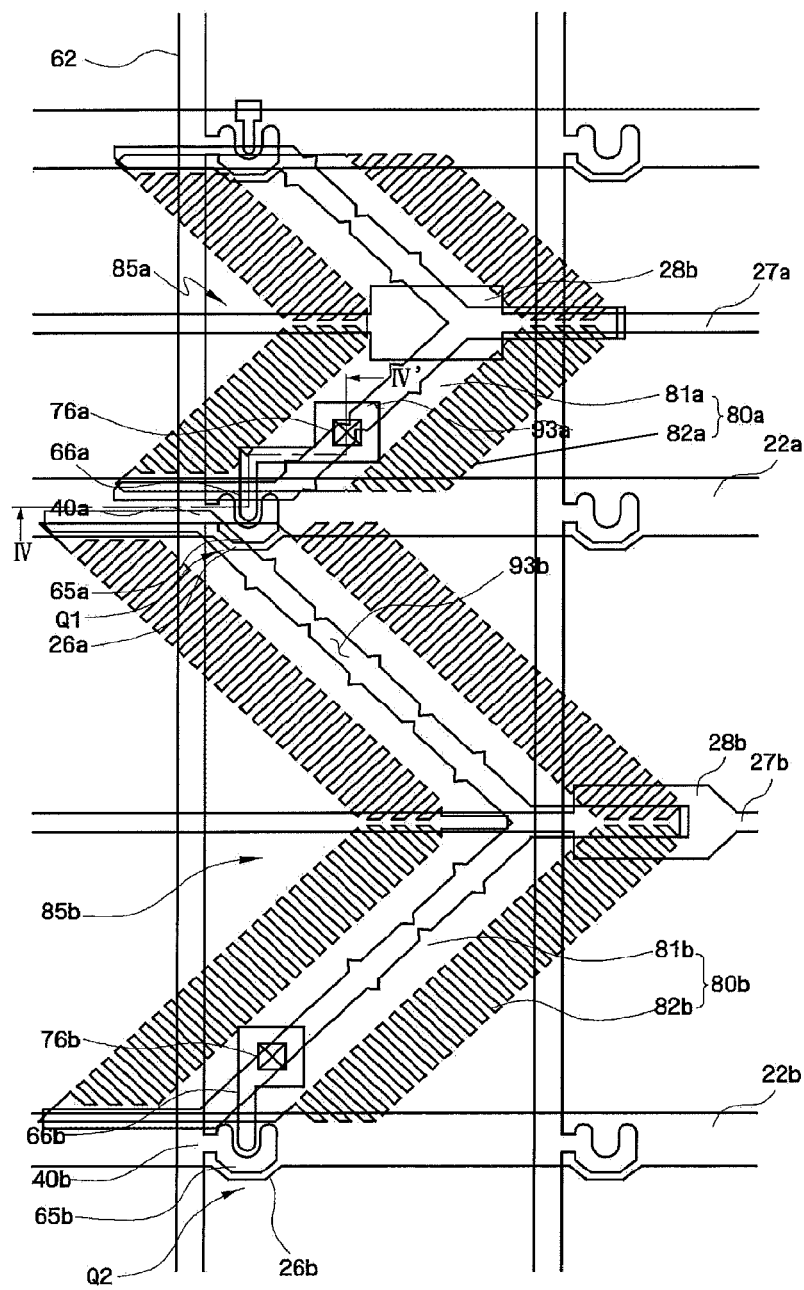
FIG. 1 is an arrangement plan of a liquid crystal display (LCD) according to one embodiment.

Various embodiments of the present invention and methods of accomplishing the same may be understood more readily by reference to the following detailed description and the accompanying drawings. The various embodiment of the present invention may, however, be embodied in many different forms and should not be construed as being limited to the embodiments set forth herein. Rather, these embodiments are provided so that this disclosure will be thorough and complete and will provide examples of the concept of the invention to those skilled in the art, and the present invention will only be defined by the appended claims.

Spatially relative terms, such as "below," "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. Like reference numerals refer to like elements throughout the specification.

Figure 2:
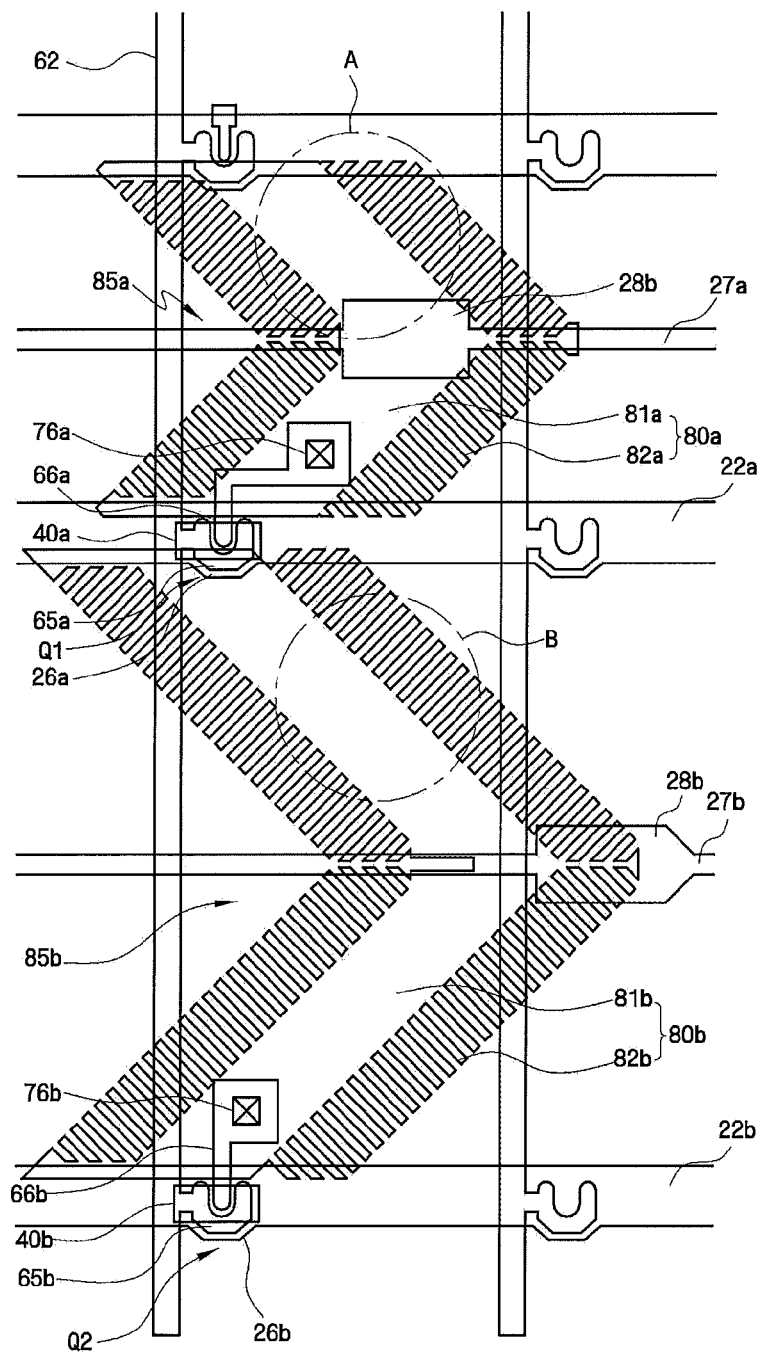
FIG. 2 is an arrangement plan of a thin-film transistor (TFT) display plate of the LCD shown in FIG. 1.
Figure 3:
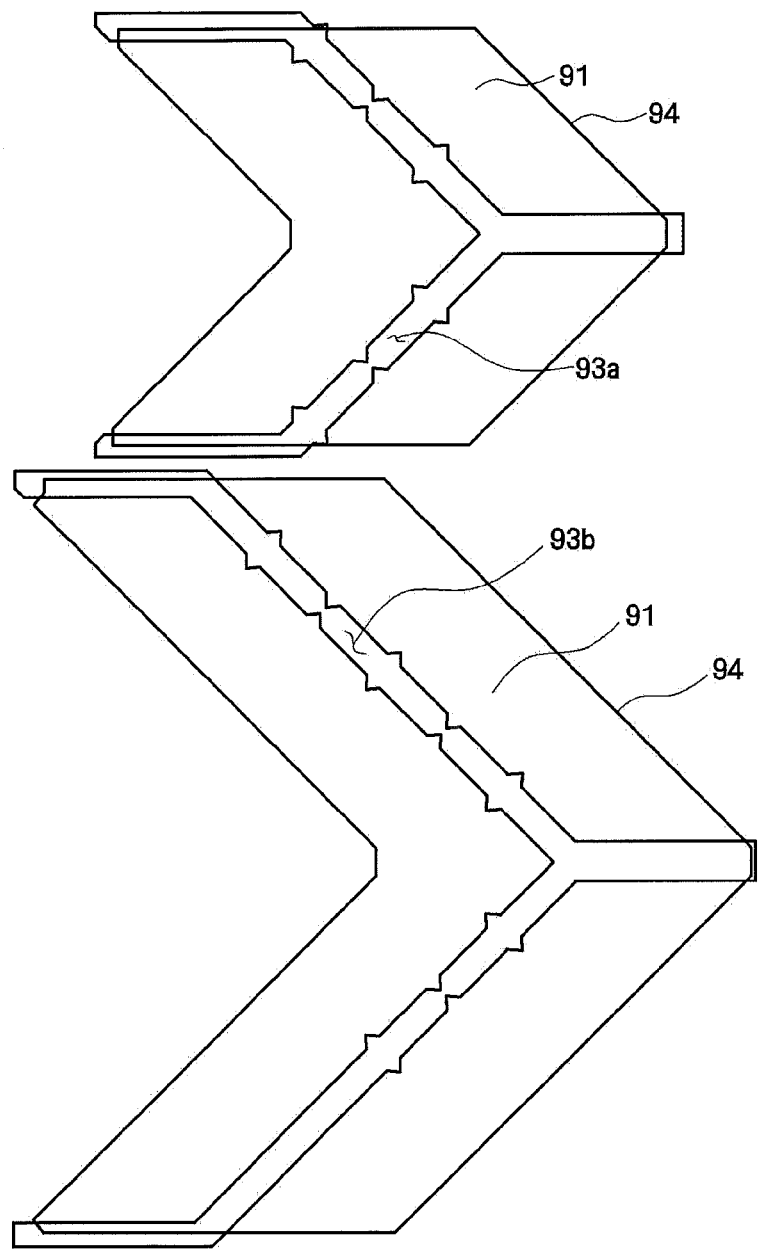
FIG. 3 is an arrangement plan of a common electrode display plate of the LCD shown in FIG. 1.
Figure 4:
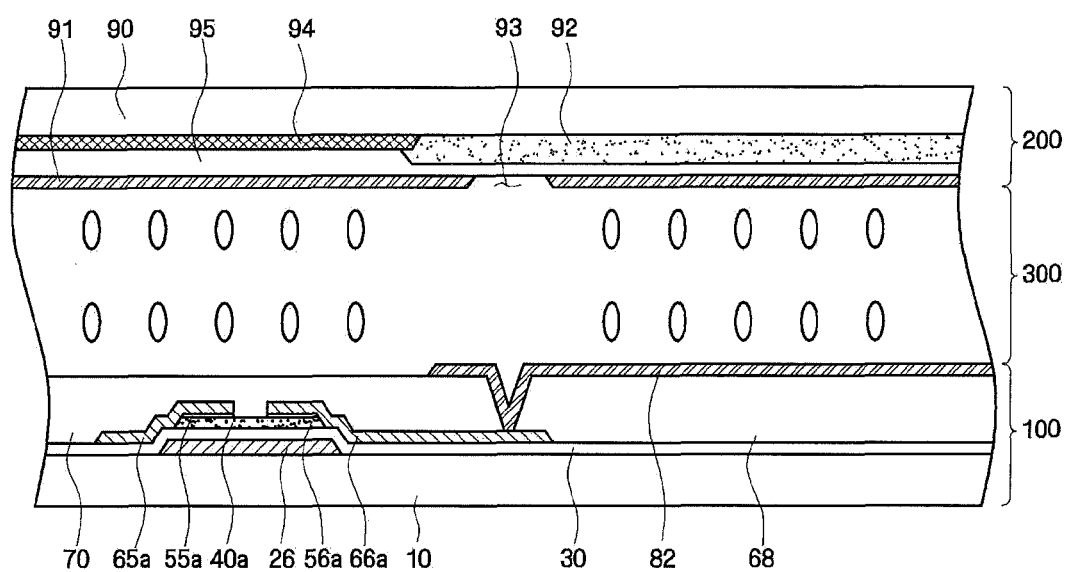
FIG. 4 is a cross-sectional view of the LCD taken along a line IV-IV' of FIG. 1.

Hereinafter, a liquid crystal display (LCD) according to one embodiment will be described in detail with reference to FIGS. 1 through 6B. FIG. 1 is an arrangement plan of the LCD according to the first embodiment of the present invention. FIG. 2 is an arrangement plan of a thin-film transistor (TFT) display plate 100 of the LCD shown in FIG. 1. FIG. 3 is an arrangement plan of a common electrode display plate 200 of the LCD shown in FIG. 1. FIG. 4 is a cross-sectional view of the LCD taken along a line IV-IV' of FIG. 1.

Referring to FIGS. 1 through 4, the LCD according to the first embodiment includes a TFT display plate 100, a common electrode display plate 200 facing the TFT display plate 100, and a liquid crystal layer 300 interposed between the TFT display plate 100 and the common electrode display plate 200.

First and second gate lines 22a and 22b are formed on a first insulating substrate 10 which is made of transparent glass. The first and second gate lines 22a and 22b generally extend horizontally and deliver gate signals. In addition, the first and second gate lines 22a and 22b are arranged parallel to each other and allocated to each pixel. Each of the first and second gate lines 22a and 22b has a first or a second gate electrode 26a or 26b which protrudes from a region thereof and has a wide width. The first and second gate lines 22a and 22b and the first and second gate electrodes 26a and 26b are collectively referred to as gate wiring.

First and second storage electrodes 27a and 27b are also formed on the first insulating substrate 10. The first and second storage electrodes 27a and 27b overlap first and second subpixel electrodes 80a and 80b, respectively, which will be described later. The first storage electrode 27a is connected to a first storage electrode line 28a which extends horizontally, and the second storage electrode 27b is connected to a second storage electrode line 28b which extends parallel to the first storage electrode line 28a. The first and second storage electrodes 27a and 27b and the first and second storage electrode lines 28a and 28b are collectively referred to as storage electrode wiring. The shape and disposition of the storage electrode wiring may vary.

The gate wiring may be made of aluminum (Al)-based metal such as Al or Al alloys, silver (Ag)-based metal such as Ag or Ag alloys, copper (Cu)-based metal such as Cu or Cu alloys, molybdenum (Mo)-based metal such as Mo or Mo alloys, chrome (Cr), titanium (Ti), or tantalum (Ta).

In addition, the gate wiring may have a multi-layer structure composed of two conductive layers (not shown) with different physical characteristics. In this case, one of the two conductive layers may be made of metal with low resistivity, such as Al-based metal, Ag-based metal or Cu-based metal, in order to reduce a signal delay or a voltage drop of the gate wiring. On the other hand, the other one of the conductive layers may be made of a different material, in particular, a material having superior contact characteristics with indium tin oxide (ITO) and indium zinc oxide (IZO), such as Mo-based metal, Cr, Ti, or Ta. Examples of the multi-layer structure include a combination of a Cr lower layer and an Al upper layer and a combination of an Al lower layer and a Mo upper layer. However, the present invention is not limited thereto. The gate wiring may be made of various metals and conductors.

A gate insulating film 30 made of silicon nitride (SiNx) is formed on the gate wiring.

First and second semiconductor layers 40a and 40b made of hydrogenated amorphous silicon or polycrystalline silicon are formed on the gate insulating film 30. The first and second semiconductor layers 40a and 40b formed on the gate insulating film 30 may have various shapes. For example, the first and second semiconductor layers 40a and 40b may be shaped like islands as in the present embodiment or may be linear.

Ohmic contact layers 55a and 56a are formed on each of the first and second semiconductor layers 40a and 40b. The ohmic contact layers 55a and 56a are made of a material such as silicide or n+hydrogenated amorphous silicon doped with n-type impurities in high concentration. A pair of the ohmic contact layers 55a and 56a are disposed on each of the first and second semiconductor layers 40a and 40b.

A data line 62 is formed on the ohmic contact layers 55a and 56a and the gate insulating film 30. The data line 62 generally extends vertically, crosses the first and second gate lines 22a and 22b, and delivers a data voltage. The data line 62 has first and second source electrode 65a and 65b extending toward first and second drain electrodes 66a and 66b, respectively. The data line 62 delivers data signals to first and second subpixel electrodes 80a and 80b. The data line 62, the first and second source electrodes 65a and 65b, and the first and second drain electrodes 66a and 66b are collectively referred to as data wiring.

The data wiring may be made of Cr, Mo-based metal, or refractory metal such as Ta and Ti. In addition, the data wiring may have a multi-layer structure composed of a lower layer (not shown) made of refractory metal, and an upper layer (not shown) made of a material with low resistivity and disposed on the lower layer. As described above, examples of the multi-layer structure may include a combination of a Cr lower layer and an Al upper layer and a combination of an Al lower layer and a Mo upper layer. Alternatively, the multi-layer structure may be a triple-layer structure having Mo—Al—Mo layers.

The first source electrode 65a at least partially overlaps the first semiconductor layer 40a. In addition, the first drain electrode 66b faces the first source electrode 65a with respect to the first gate electrode 26a and at least partially overlaps the first semiconductor layer 40a. The ohmic contact layers 55a and 56a described above are interposed between the first semiconductor layer 40a, which is disposed thereunder, and the first source electrode 65a and the first drain electrode 66a which are disposed thereon, respectively. Thus, the ohmic contact layers 55a and 56a reduce contact resistance between the first semiconductor layer 40a and the first source and drain electrodes 65a and 66a, respectively.

The second source electrode 65b at least partially overlaps the second semiconductor layer 40b. In addition, the second drain electrode 66b faces the second source electrode 65b with respect to the second gate electrode 26b and at least partially overlaps the second semiconductor layer 40b.

A passivation layer 70 is formed on the data wiring and exposed portions of the first and second semiconductor layers 40a and 40b. The passivation layer 70 is made of an inorganic matter such as silicon nitride or silicon oxide, an organic matter having photosensitivity and superior planarization characteristics, or a low-k dielectric material formed by plasma enhanced chemical vapor deposition (PECVD), such as a-Si:C:O or a-Si:O:F. The passivation layer 70 may have a double-layer structure composed of a lower inorganic layer and an upper organic layer in order to protect the exposed portions of the first and second semiconductor layers 40a and 40b while taking advantage of the superior characteristics of the organic layer. Furthermore, a red (R), a green (G) or a blue (B) color filter layer may be used as the passivation layer 70.

First and second contact holes 76a and 76b are formed in the passivation layer 70. The first subpixel electrode 80a is physically and electrically connected to the first drain electrode 66a by the first contact hole 76a and thus receives a data voltage and a control voltage from the first drain electrode 66a. The second subpixel electrode 80b is physically and electrically connected to the second drain electrode 66b by the second contact hole 76b and thus receives a data voltage and a control voltage from the second drain electrode 66b.

The first and second subpixel electrodes 80a and 80b, to which the data voltages are applied, generate an electric field together with a common electrode 91 of the common electrode display plate 200 to determine the alignment of liquid crystal molecules interposed between the common electrode 91 and the first and second subpixel electrodes 80a and 80b. The first and second subpixel electrodes 80a and 80b are collectively referred to as a pixel electrode.

The first subpixel electrode 80a is driven by a first TFT Q1. The first TFT Q1 is a three-terminal device which is composed of the first gate electrode 26a, the first source electrode 65a and the first drain electrode 66a and forms a switching device. The first TFT Q1 operates in response to a gate signal received from the first gate electrode 26a. When a gate-on signal is input to the first gate electrode 26a, a data signal is transmitted to the first subpixel electrode 80a via the first source electrode 65a and the first drain electrode 66a.

The second subpixel electrode 80b is driven by a second TFT Q2. The second TFT Q2 is a three-terminal device which is composed of the second gate electrode 26b, the second source electrode 65b and the second drain electrode 66b and forms a switching device. The second TFT Q2 operates in response to a gate signal received from the second gate electrode 26b. When a gate-on signal is input to the second gate electrode 26b, a data signal is transmitted to the second subpixel electrode 80b via the second source electrode 65b and the second drain electrode 66b.

A data signal, which has a higher voltage level than a data signal transmitted to the second subpixel electrode 80b, may be transmitted to the first subpixel electrode 80a, and the first subpixel electrode 80a may be smaller than the second subpixel electrode 80b.

As shown in FIGS. 1 and 2, the first subpixel electrode 80a and the second subpixel electrode 80b may be alternately arranged along the data line 62. In addition, the second subpixel electrode 80b may surround the first subpixel electrode 80a. That is, when a pixel is large-sized, a subpixel electrode may be formed to surround the other subpixel electrode so that light of an intermediate grayscale level, which is a mixture of light of different grayscale levels, can be emitted. When a pixel is small-sized, even if two subpixel electrodes are arranged alternately, light of an intermediate grayscale level can be effectively emitted.

The first subpixel electrode 80a and the second subpixel electrode 80b may include one or more first bent portions 85a and one or more second bent portions 85b, respectively, in order to expand a region in which liquid crystals can be effectively controlled, and ultimately increase an aperture ratio.

The first bent portions 85a are formed by bending the first subpixel electrode 80a, and the number of first bent portions 85a may depend on a length of the first subpixel electrode 80a. The second bent portions 85b are formed by bending the second subpixel electrode 80b, and the number of second bent portions 85b may depend on a length of the second subpixel electrode 80b.

A plurality of first fine protruding patterns 82a and a plurality of second fine protruding patterns 82b are formed along edges of the first and second subpixel electrodes 80a and 80b, respectively. The first fine protruding patterns 82a and the second fine protruding patterns 80b will be described in detail later with reference to FIGS. 5 and 6.

The common electrode display plate 200 will now be described with reference to FIGS. 1 and 3. A black matrix 94 is formed on a second insulating substrate 90, which is made of for example, transparent glass, to prevent leakage of light and define a pixel region. The black matrix 94 may be formed in regions, which correspond to the first and second gate lines 22a and 22b and the data line 62, and regions which correspond to the first and second TFTs Q1 and Q2. In addition, the black matrix 94 may have various shapes to prevent the leakage of light in the vicinity of the first and second subpixel electrodes 80a and 80b and the first and second TFTs Q1 and Q2. That is, the black matrix 94 may be bent after the shape of the first and second subpixel electrodes 80a and 80b. The black matrix 94 may be made of metal (metal oxide), such as chrome or chrome oxide, or organic black resist.

In addition, red, green, and blue (RGB) color filters 92 may be sequentially arranged in the pixel region between portions of the black matrix 94. An overcoat layer 95 may be formed on the RGB color filters 92 in order to planarize their step heights.

The common electrode 91 is made of a transparent conductive material, such as ITO or IZO, and disposed on the overcoat layer 95. The common electrode 91 may face the first and second subpixel electrode 80a and 80b and may be bent in a zigzag manner to have a shape which corresponds to the shape of the first and second subpixel electrodes 80a and 80b. In addition, the common electrode 91 includes first and second slit patterns 93a and 93b which are disposed at locations corresponding to the first and second subpixel electrodes 80a and 80b, respectively. The first and second slit patterns 93a and 93b may be formed by partially patterning the common electrode 91 and may function as domain formation portions. The first and second slit patterns 93a and 93b may overlap middle portions of the first and second subpixel electrodes 80a and 80b, respectively.

An alignment film (not shown), which aligns liquid crystal molecules, may be coated on the common electrode 91.

If the TFT display plate 100 and the common electrode display plate 200 structured as described above are aligned and coupled to each other and if the liquid crystal layer 300 is formed by injecting a liquid crystal material between the TFT display plate 100 and the common electrode display plate 200, a basic structure of the LCD according to the first embodiment of the present invention is complete. When no electric field is applied between the first and second subpixel electrodes 80a and 80b and the common electrode 91, directors of liquid crystal molecules contained in the liquid crystal layer 300 may be aligned perpendicular to the TFT display plate 100 and the common electrode display plate 200, and the liquid crystal molecules may have negative dielectric anisotropy. When an electric field is applied between the first and second subpixel electrodes 80a and 80b and the common electrode 91, the liquid crystal molecules may tilt perpendicular to the first and second slit patterns 93a and 93b and thus be partitioned into a plurality of domains.

Figure 5:
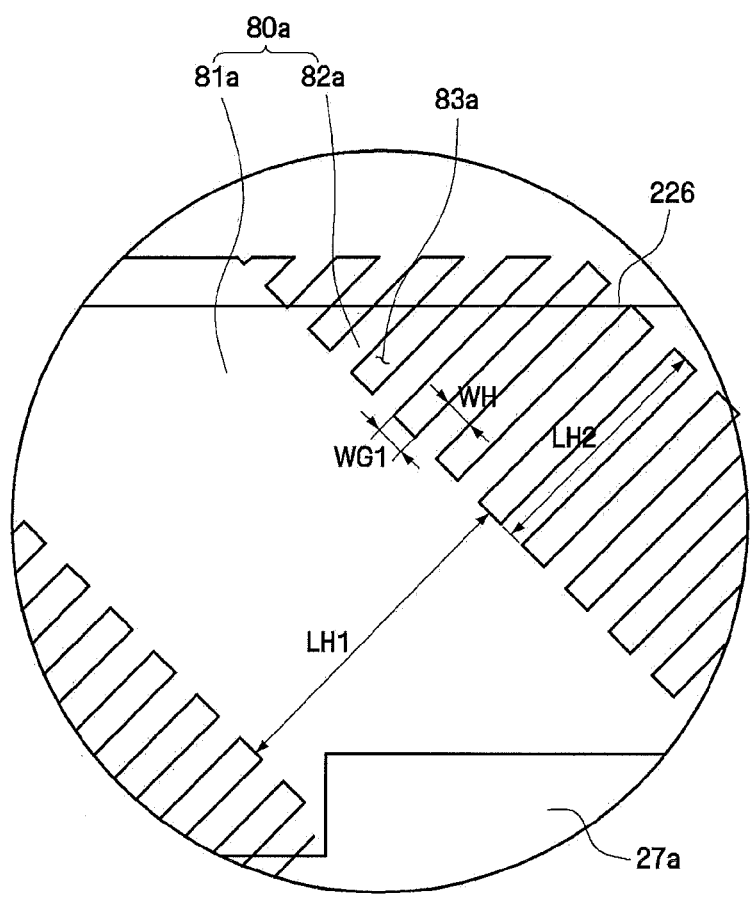
FIG. 5 is a partially enlarged view of a region A of the TFT display plate shown in FIG. 2.
Figure 6:
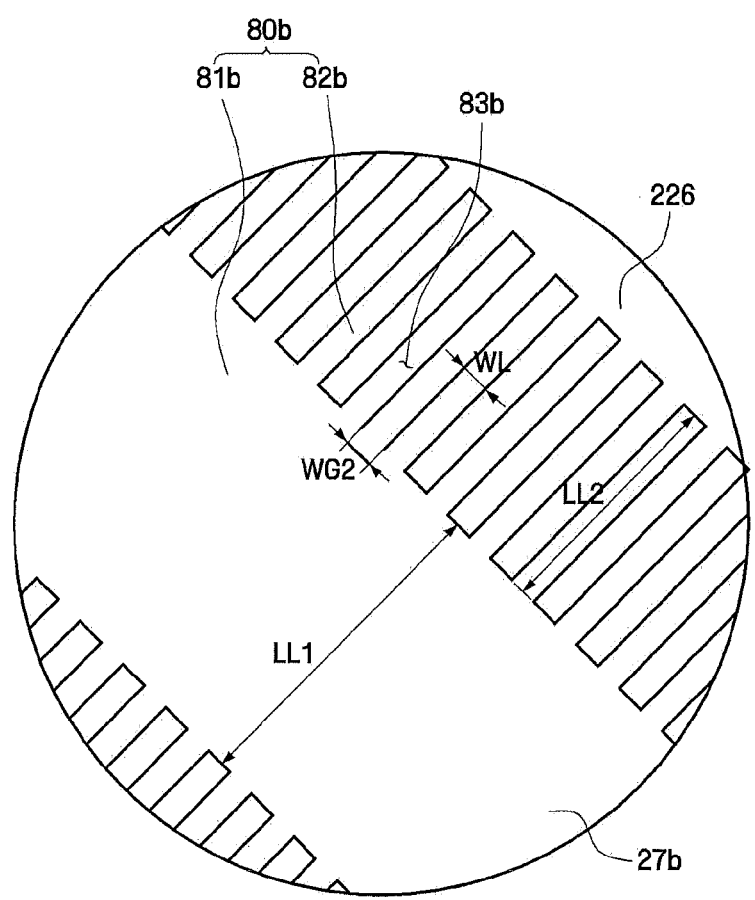
FIG. 6 is a partially enlarged view of a region B of the TFT display plate shown in FIG. 2.

The structures of the first and second fine protruding patterns 82a and 82b of the first and second subpixel electrodes 80a and 80b, respectively, will now be described in detail with reference to FIGS. 1, 5 and 6. FIG. 5 is a partially enlarged view of a region A of the TFT display plate 100 shown in FIG. 2. FIG. 6 is a partially enlarged view of a region B of the TFT display plate 100 shown in FIG. 2.

The length and width of each of the first and second fine protruding patterns 82a and 82b of the first and second subpixel electrodes 80a and 80b may affect the transmission ratio, response time (the retardation behavior of liquid crystal molecules in a middle portion of each pixel electrode) and display quality (such as stains) of the LCD. The lengths of the first and second fine protruding patterns 82a and 82b will be described first before the widths thereof.

Referring to FIGS. 1, 5 and 6, the first fine protruding patterns 82a are formed along an edge of the first subpixel electrode 80a. The first fine protruding patterns 82a are formed perpendicular to the first slit patterns 93a which are domain formation portions.

The second fine protruding patterns 82b are formed along an edge of the second subpixel electrode 80b. The second fine protruding patterns 82b are formed perpendicular to the second slit patterns 93b which are domain formation portions. The first and second fine protruding patterns 82a and 82b may not be formed along surfaces of the first and second subpixel electrodes 80a and 80b, respectively, which are adjacent to the first and second gate lines 22a and 22b.

The first subpixel electrode 80a includes a first flat portion 81a, which is formed in the middle thereof, and the first fine protruding patterns 82a which protrude from an edge of the first flat portion 81a. In addition, a first gap 83a is formed between the first fine protruding patterns 82a. The second subpixel electrode 80b includes a second flat portion 81b, which is formed in the middle thereof, and the second fine protruding patterns 82b which protrude from an edge of the second flat portion 81b. In addition, a second gap 83b is formed between the second fine protruding patterns 82b.

A width LH1 of the first flat portion 81a of the first subpixel electrode 80a is less than a width LL1 of the second flat portion 81b of the second subpixel electrode 80b. A length LH2 of each of the first fine protruding patterns 82a is greater than a length LL2 of each of the second fine protruding patterns 82b.

The rotation of liquid crystal molecules is affected by the distance between the first and second flat portions 81a and 81b and the first and second slit patterns 93a and 93b. Specifically, when an electric field is formed between the first and second subpixel electrodes 80a and 80b and the common electrode 91, liquid crystal molecules start to rotate from edges of the first and second pixel electrodes 80a and 80b and the common electrode 91. That is, the liquid crystal molecules rotate in a direction from edges of the first and second flat portions 81a and 81b of the first and second subpixel electrodes 80a and 80b and in a direction from the first and second slit patterns 93a and 93b of the common electrode 91 toward a middle portion of the first and second flat portions 81a and 81b of the first and second subpixel electrodes 80a and 80b.

Accordingly, if the distance between the edges of the first and second flat portions 81a and 81b of the first and second subpixel electrodes 80a and 80b and the first and second slit patterns 93a and 93b of the common electrode 91 is increased, the rotation of the liquid crystal molecules may slow down, thereby generating an afterimage. For this reason, the widths LH1 and LL1 of the first and second flat portions 81a and 81b, respectively, may be reduced in order to accelerate the behavior velocity of the liquid crystal molecules. However, if the widths LH1 and LL1 of the first and second flat portions 81a and 81b, respectively, are reduced, the overall aperture ratio may be reduced. Therefore, it is required to reach a compromise between the widths LH1 and LL1 of the first and second flat portions 81a and 81b, respectively, and the aperture ratio.

Since a higher voltage than a voltage that is applied to the second subpixel electrode 80b is applied to the first subpixel electrode 80a, the first subpixel electrode 80a has greater effects on luminance than the second subpixel electrode 80b. Thus, the width LH1 of the first flat portion 81a may be formed less than the width LL1 of the second flat portion 81b to minimize a reduction in the overall aperture ratio while accelerating the behavior velocity of liquid crystal molecules. On the other hand, the length LH2 of each of the first fine protruding patterns 82a may be greater than the length LL2 of each of the second fine protruding patterns 82b.

The sum of a width WH of each of the first fine protruding patterns 82a and a width WG1 of the first gap 83a may be greater than the sum of a width WL of each of the second fine protruding patterns 82b and a width WG2 of the second gap 83b. As the sum of a width of a fine protruding pattern and a width of a gap is reduced, an aperture ratio of each pixel increases. However, the display quality of an LCD may deteriorate. For example, liquid crystals may be dragged, and stains may be created. In particular, if each pixel electrode is divided into the first and second subpixel electrodes 80a and 80b as in the LCD according to the first embodiment and if different voltages are applied to the first and second subpixel electrodes 80a and 80b, liquid crystal molecules controlled by the first subpixel electrode 80a, to which a higher voltage is applied, may behave in a less stable manner.

A region having a problem with the behavior velocity of liquid crystal molecules is usually a low-grayscale region. The low-grayscale region is relatively less affected by the second subpixel electrode 80b, to which a low voltage is applied, than the first subpixel electrode 80a to which a high voltage is applied. Therefore, the width WL of each of the second fine protruding patterns 82b and the width WG2 of the second gap 83b included in the second subpixel electrode 80b, to which a low voltage is applied, may be relatively increased while the width WH of each of the first fine protruding patterns 82a and the width WG1 of the first gap 83a included in the first subpixel electrode 80a, to which a high voltage is applied, are relatively reduced. Then, the overall aperture ratio may be increased while the behavior velocity of liquid crystals is accelerated.

Since the first subpixel electrode 80a has greater effects on the behavior velocity of liquid crystals than on the aperture ratio, the width WH of each of the first fine protruding patterns 82a may be formed to be less than the width WG1 of the first gap 83a. On the other hand, since the second subpixel electrode 80b has greater effects on the aperture ratio than on the behavior velocity of liquid crystals, the width WL of each of the second fine protruding patterns 82b may be formed to be greater than the width WG2 of the second gap 83b.

Figure 7:
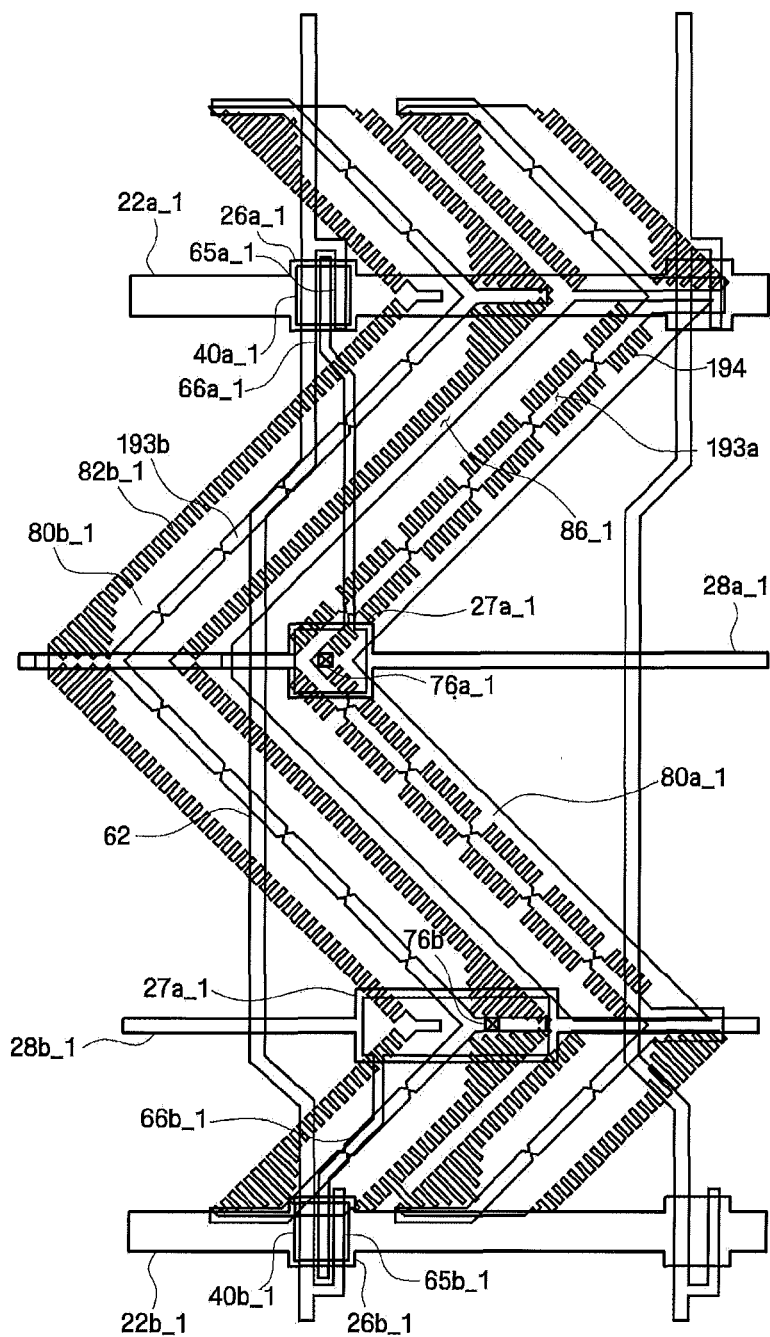
FIG. 7 is an arrangement plan of an LCD according to another embodiment.
Figure 8:
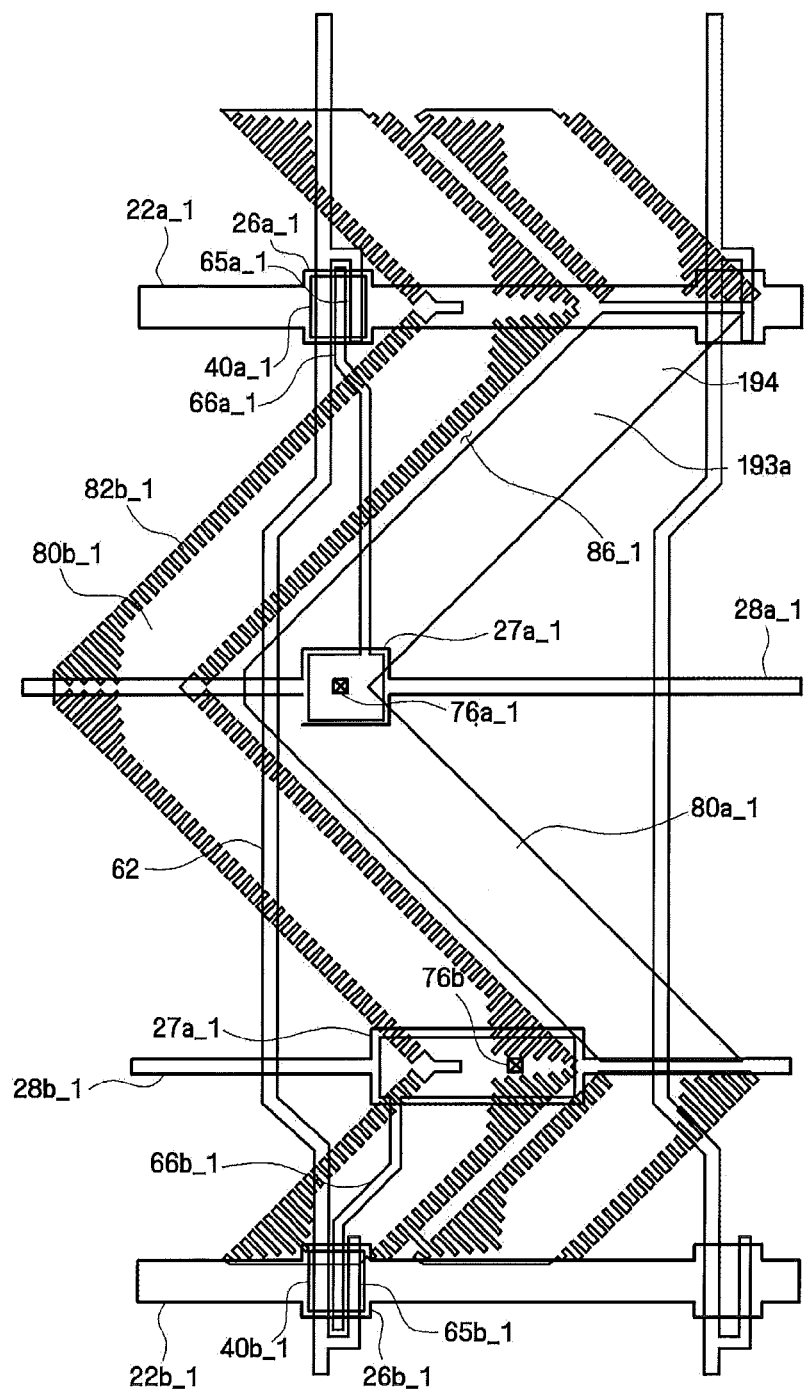
FIG. 8 is an arrangement plan of a TFT display plate of the LCD shown in FIG. 7.
Figure 9:
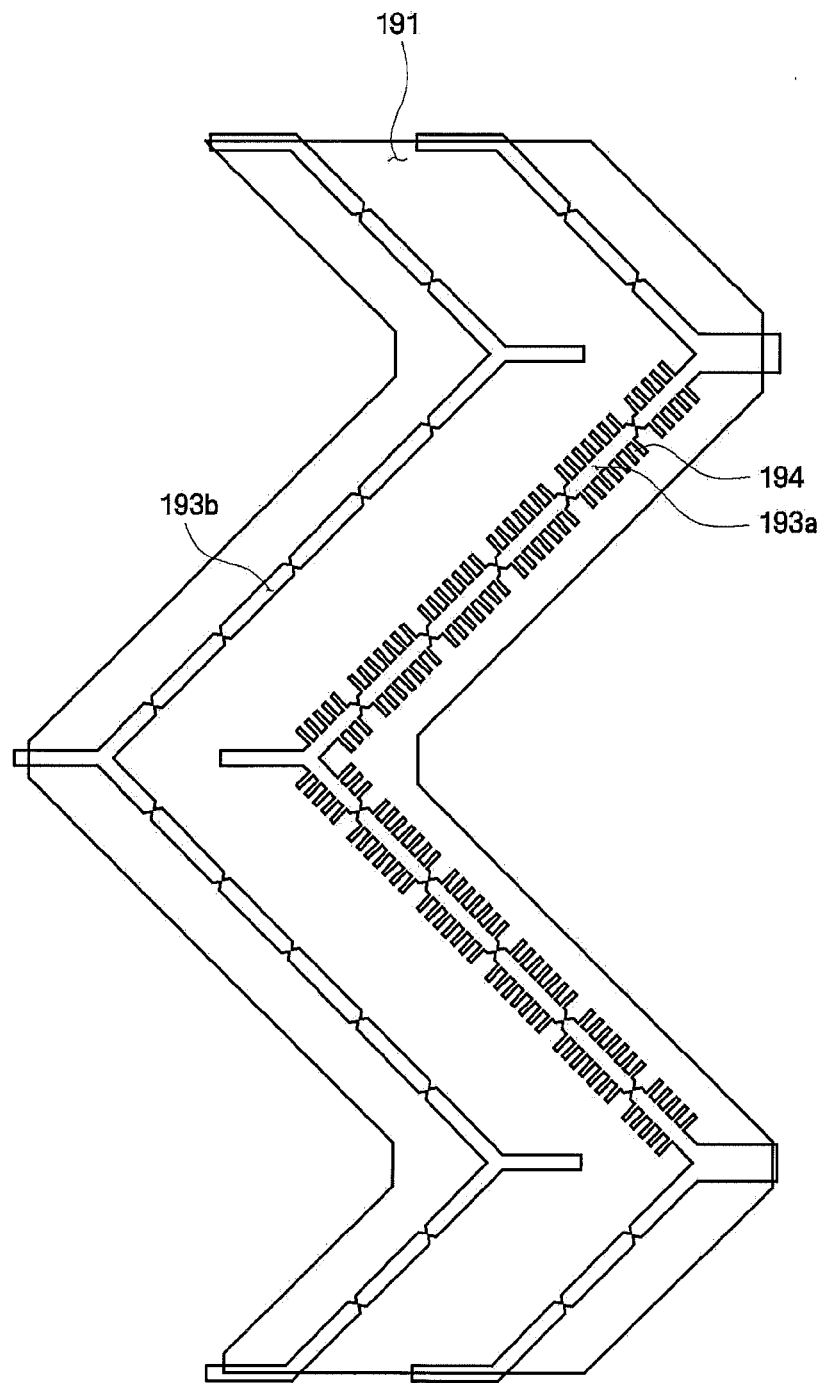
FIG. 9 is an arrangement plan of a common electrode display plate of the LCD shown in FIG. 7.

Hereinafter, an LCD according to a second embodiment will be described in detail with reference to FIGS. 7 through 9. FIG. 7 is an arrangement plan of the LCD according to the second embodiment. FIG. 8 is an arrangement plan of a TFT display plate of the LCD shown in FIG. 7. FIG. 9 is an arrangement plan of a common electrode display plate of the LCD shown in FIG. 7.

Referring to FIGS. 7 through 9, the LCD according to the second embodiment includes a first subpixel electrode 80a_1, which does not have fine patterns; a second subpixel electrode 80b_1, which has fine patterns: and a common electrode 191 which has fine patterns at a location corresponding to the first subpixel electrode 80a_1.

The TFT display plate includes first and second gate lines 22a_1 and 22b_1 formed on a first insulating substrate 10. The first and second gate lines 22a_1 and 22b_1 extend horizontally and parallel to each other. The TFT display plate also includes a data line 62_1 which crosses the first and second gate lines 22a 1 and 22b_1. The first and second gate lines 22a_1 and 22b_1 have first and second gate electrodes 26a_1 and 26b_1, respectively.

First and second subpixel electrodes 80a_1 and 80b_1 may be bent in a zigzag manner and may be separated from each other by a slit 86_1 which is a domain formation portion. However, the domain formation portion may not be limited to the slit portion 86_1 and may also be a protrusion.

The first subpixel electrode 80a_1 is surrounded by the second subpixel electrode 80b_1, and a higher data voltage than a data voltage that is applied to the second subpixel electrode 80b_1 is applied to the first subpixel electrode 80a_1. The second subpixel electrode 80b_1 receives a lower data voltage than a data voltage applied to the first subpixel electrode 80a_1 and includes fine protruding patterns 82b_1 at an edge thereof. That is, the fine protruding patterns 82b_1 may be formed in the second subpixel electrode 80b_1 while no fine protruding patterns are formed in the first subpixel electrode 80a_1.

The common electrode display plate faces the TFT display plate and includes the common electrode 191 which overlaps the first and second subpixel electrodes 80a_1 and 80b_1. The common electrode 191 faces each of the first and second subpixel electrodes 80a_1 and 80b_1 and includes a first slit pattern 913a and a second slit pattern 193b which respectively partition a first subpixel region and a second subpixel region into a plurality of domains. The first slit pattern 193a passes through a middle portion of the first subpixel electrode 80a_1, partitions the first subpixel region into a plurality of domains, and includes concavo-convex patterns 194. The concavo-convex patterns 194 reduce a width of the common electrode 191 and accelerate the behavior velocity of liquid crystal molecules.

Figure 10:
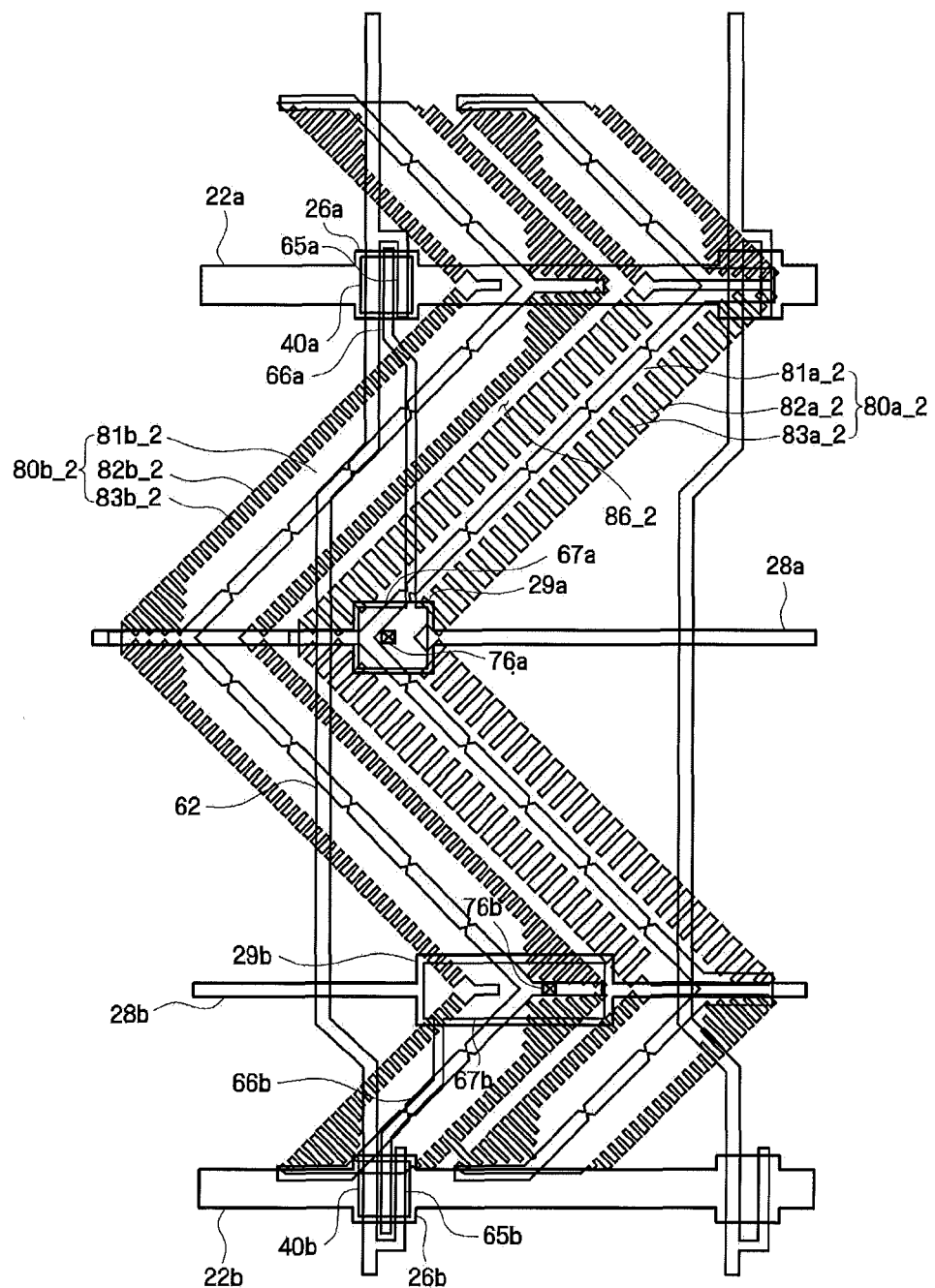
FIG. 10 is an arrangement plan of an LCD according to the another embodiment.

Hereinafter, an LCD according to a third embodiment will be described in detail with reference to FIG. 10. FIG. 10 is an arrangement plan of the LCD according to the third embodiment. For simplicity, elements substantially identical to those of the first or second exemplary embodiment are indicated by like reference numerals, and thus their description will be omitted.

Referring to FIG. 10, the LCD according to the third embodiment includes a first subpixel electrode 80a_2 having a plurality of first fine protruding patterns 82a_2 separated from each other by a first gap 83a_2, and a second subpixel electrode 80b_2 having a plurality of second fine protruding patterns 82b_1 separated from each other by a second gap 83b_2. A length of each of the first fine protruding patterns 82a_1 may be greater than that of each of the second fine protruding patterns 82b_1. In addition, the sum of a width of each of the first fine protruding patterns 82a_1 and a width of the first gap 83a_1 may be greater than the sum of a width of each of the second fine protruding patterns 82b_2 and a width of the second gap 83b_2.

The first and second subpixel electrodes 80a_2 and 80b_2 may be bent in a zigzag manner and may be separated from each other by a slit 86_2 which is a domain formation portion.

The first subpixel electrode 80a_2 includes a first flat portion 81a_2 in the middle thereof and the first fine protruding patterns 82a_2 at an edge thereof. The second subpixel electrode 80b_2 includes a second flat portion 81b_2 in the middle thereof and the second fine protruding patterns 82b_2 at an edge thereof. Here, a width of the first flat portion 81a_2 may be less than that of the second flat portion 81b_2, and the length of each of the first fine protruding patterns 82a_2 may be greater than that of each of the second fine protruding patterns 82b_2. The sum of the width of each of the first fine protruding patterns 82a_2 and that of the first gap 83a_2 may be greater than the sum of the width of each of the second fine protruding patterns 82b_2 and the width of the second gap 83b_2.

Figure 11:
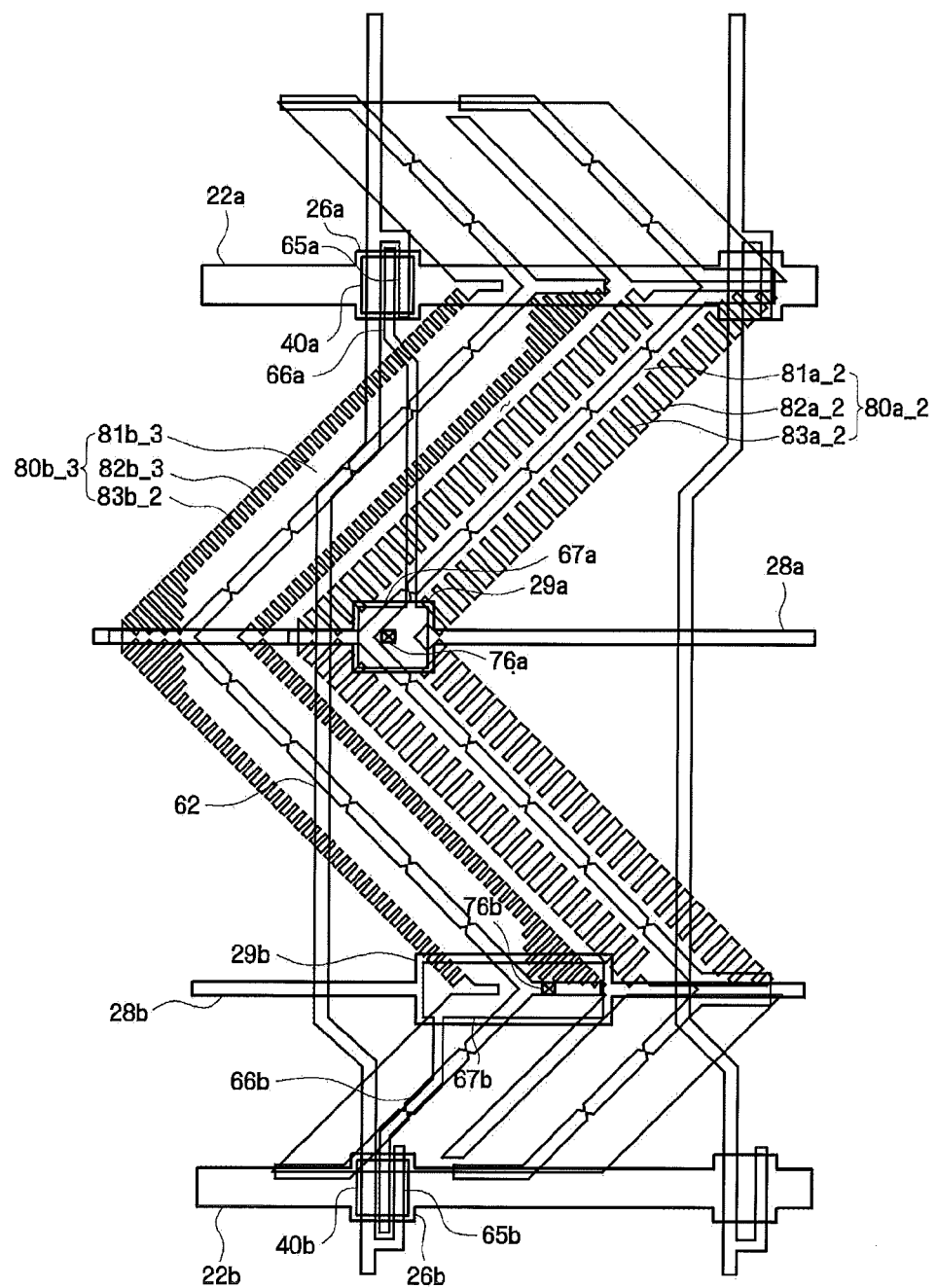
FIG. 11 is an arrangement plan of an LCD according to a still another embodiment.

Hereinafter, an LCD according to a fourth embodiment will be described in detail with reference to FIG. 11. FIG. 11 is an arrangement plan of the LCD according to the fourth embodiment. For simplicity, elements substantially identical to those of the first or second embodiment are indicated by like reference numerals, and thus their description will be omitted.

Referring to FIG. 11, the LCD according to the fourth embodiment includes a first subpixel electrode 80a_2 having a plurality of first fine protruding patterns 82a_2, and a second subpixel electrode 80b_3 having a plurality of second fine protruding patterns 82b_3 in a region thereof.

The second fine protruding patterns 82b_3 are formed in a region of the second subpixel electrode 80b_3 and are not formed in other regions thereof. Specifically, the fourth embodiment is a modified embodiment of the third embodiment. In the fourth embodiment, the second fine protruding patterns 82b_3 are formed in a region of the second subpixel electrode 80b_3, to which a relatively lower voltage than a voltage applied to the first subpixel electrode 80a_3 is applied, and are not formed in other regions of the second subpixel electrode 80b_3. Since the second fine protruding patterns 82b_3 are formed, the behavior velocity of liquid crystal molecules may be improved at a low-grayscale level. However, the aperture ratio may relatively be reduced. Thus, the second fine protruding patterns 82b_3 may be formed only in a region of the second subpixel electrode 80b_3 in order to improve the behavior velocity of liquid crystal molecules while preventing a reduction in the aperture ratio. The fine protruding patterns may be formed at various locations according to various embodiments of the present invention.

While various embodiments of the present invention have been particularly shown and described herein, it will be understood by those of ordinary skill in the art that various changes in form and detail may be made therein without departing from the spirit and scope of the present invention as defined by the following claims. The various embodiments should be considered in a descriptive sense only and not for purposes of limitation.

What is claimed is:

1. A liquid crystal display (LCD) comprising:
an insulating substrate;
a first gate line and a second gate line that are formed on the insulating substrate and that extend parallel to each other;
a data line formed on the insulating substrate insulated from the first and second gate lines and crossing the first and second gate lines;
a first subpixel electrode connected to the first gate line and the data line by a first switching device and comprising a plurality of first fine protruding patterns at an edge thereof; and
a second subpixel electrode connected to the second gate line and the data line by a second switching device and comprising a plurality of second fine protruding patterns at an edge thereof,
wherein the first fine protruding patterns are separated from each other by a first gap, and the second fine protruding patterns are separated from each other by a second gap, wherein the sum of a width of the first gap and a width of each of the first fine protruding patterns is greater than the sum of a width of the second gap and a width of each of the second protruding patterns.

2. The LCD of claim 1, wherein a higher voltage than a voltage that is applied to the second subpixel electrode is configured to be applied to the first subpixel electrode.

3. The LCD of claim 1, wherein each of the first subpixel electrode and the second subpixel electrode comprises at least one bent portion.

4. The LCD of claim 3, wherein the first and second subpixel electrodes are alternately arranged along the data line.

5. The LCD of claim 3, wherein the first and second subpixel electrodes are aligned in a substantially zigzag manner along the data line.

6. The LCD of claim 5, wherein the first subpixel electrode extends along and proximate to the second subpixel electrode.

7. The LCD of claim 3, wherein an area of the first subpixel electrode is smaller than an area of the second subpixel electrode.

8. The LCD of claim 1, wherein a length of each of the first fine protruding patterns is greater than a length of each of the second fine protruding patterns.

9. The LCD of claim 1, wherein the second fine protruding patterns are formed at part of the edge of the second subpixel electrode.

10. An LCD comprising:
an insulating substrate;
a first subpixel electrode formed on the insulating substrate, and comprising a flat portion and a plurality of first fine protruding patterns formed at an edge of the flat portion; and
a second subpixel electrode formed on the insulating substrate, and comprising a second flat portion and a plurality of second fine protruding patterns formed at an edge of the second flat portion,
wherein a width of the second flat portion is greater than a width of the first flat portion.

11. The LCD of claim 10, wherein the first subpixel is configured to be driven by a first switching device, and the second subpixel electrode is configured to be driven by a second switching device.

12. The LCD of claim 11, wherein a higher voltage than a voltage that is applied to the second subpixel electrode is configured to be applied to the first subpixel electrode.

13. The LCD of claim 12, wherein the first subpixel electrode comprises a first gap between the first fine protruding patterns, and a width of each of the first fine protruding patterns is less than a width of the first gap.

14. The LCD of claim 12, wherein the second subpixel electrode comprises a second gap between the second fine protruding patterns, and a width of each of the second fine protruding patterns is greater than a width of the second gap.

* * * * *